United States Patent [19]

Sogo

[11] 4,359,909
[45] Nov. 23, 1982

[54] TRANSMISSION

[75] Inventor: Yoshitaka Sogo, Toyota, Japan

[73] Assignee: Toyota Jidosha Kogyo Kabushiki Kaisha, Toyoto, Japan

[21] Appl. No.: 171,757

[22] Filed: Jul. 24, 1980

[30] Foreign Application Priority Data

Apr. 3, 1980 [JP] Japan ............................ 55-45144[U]

[51] Int. Cl.³ ........................ F01M 9/10; F16H 57/04
[52] U.S. Cl. ..................................... 74/467; 184/6.12
[58] Field of Search ................. 74/467, 606 R, 606 A; 184/6.12

[56] References Cited

U.S. PATENT DOCUMENTS

| | | | |
|---|---|---|---|
| 1,220,810 | 3/1917 | Alquist | 74/467 |
| 2,270,980 | 1/1942 | Tidball | 74/606 |
| 2,654,441 | 10/1953 | Orr et al. | |
| 2,950,628 | 8/1960 | Bade | 74/606 |
| 3,195,682 | 7/1965 | Reneerkens | 184/6.12 |
| 3,214,989 | 11/1965 | Wellauer et al. | 184/6.12 |
| 3,508,630 | 4/1970 | Keller et al. | 74/467 |
| 3,605,946 | 9/1971 | Oehl | 184/6.12 |
| 3,650,353 | 3/1972 | Abbott | 184/6.12 |
| 4,240,524 | 12/1980 | Katayama et al. | 184/6.12 |

OTHER PUBLICATIONS

WIPO International Application 80/01200, published Jun. 12, 1980.

Primary Examiner—Lawrence J. Staab
Attorney, Agent, or Firm—Cushman, Darby & Cushman

[57] ABSTRACT

A transmission comprising a housing having one and the other longitudinal end walls. An input shaft is rotatably supported by a bearing in the one longitudinal end wall. A bearing retainer having therein an opening through which the input shaft extends is mounted on the outer surface of the one longitudinal end wall and cooperates with the bearing to define a chamber. A seal member is disposed between the opening and the input shaft within the chamber. An oil receiver is disposed within the housing adjacent to an input gear mounted on the input shaft and in mesh with a counter gear mounted on a counter shaft. Lubricating oil within a reservoir at the bottom of the housing is scooped up by the counter gear and is received by the receiver. The oil is introduced through a passage from the receiver into the chamber to lubricate the bearing and the seal member.

14 Claims, 13 Drawing Figures

FIG. I

TRANSMISSION

BACKGROUND OF THE INVENTION

1. Field of the Invention

The present invention relates to a transmission, and more particularly to a manual transmission for use in vehicles.

2. Description of the Prior Art

In general, a conventional manual transmission comprises a housing which has one longitudinal end wall and the other longitudinal end wall and has a bottom defining a reservoir for lubricating oil. First and second bearings are disposed in upper and lower sections of the one longitudinal end wall of the housing, respectively. A third bearing is disposed in the other longitudinal end wall of the housing in an axially aligned relation to the second bearing. An input shaft adapted to be connected to an output shaft of an engine through a clutch is rotatably supported by the first bearing and has one axial end projecting outwardly of the housing and the other axial end projecting inwardly of the housing. An input gear is mounted on the other end of the output shaft for rotation therewith. A counter shaft parallel to the input shaft is rotatably supported by the second and third bearings. A counter gear is mounted on the counter shaft for rotation therewith and is in mesh with the input gear. At least a bottom portion of the counter gear is immersed in the lubricating oil within the reservoir. A bearing retainer is mounted on the outer surface of the one longitudinal end wall of the housing to retain the first and second bearings in their positons. The bearing retainer has therein an opening through which the input shaft extends. A ring seal member is disposed between the opening in the bearing retainer and the input shaft to seal an annular clearance therebetween.

In the conventional transmission described above, the first bearing supporting the input shaft is lubricated only by the lubricating oil scooped up by the counter gear and adhered to the first bearing when the input shaft is rotated to cause the counter gear to be rotated. The quantity of the lubricating oil spattered or splashed on the inner surface of the first bearing is in proportion to the rotational speed of the counter gear and/or the temperature of the lubricating oil, and is insufficient to lubricate the first bearing when the rotational speed of the counter gear and/or the temperature of the lubricating oil are or is low. The insufficient lubrication causes the temperature of the first bearing to be increased to result in the shortness of service life of the first bearing.

In addition, the seal member disposed between the opening in the retainer and the input shaft is lubricated only by the lubricating oil passing through the first bearing. There is little lubricating oil supplied to the seal member through the first bearing when the rotational speed of the counter gear and/or temperature of the lubricating oil are or is low. The seal member made of a resilient material such as rubber is apt to be deteriorated or degraded because of the insufficient supply of lubricating oil, thereby to cause a leakage of the lubricating oil to occur through the seal member.

The second bearing supporting the counter shaft is at least partially dipped in the lubricating oil within the reservoir, during the halt of the operation of the transmission. When the transmission is operated to cause the counter gear to be rotated, the lubricating oil within the reservoir is scooped up by the large diameter counter gear and is reduced to such a level that the substantially entire second bearing is exposed. Accordingly, during the operation of the transmission, the second bearing is lubricated only by a small amount of lubricating oil adhered to the second bearing prior to the rotation of the counter gear. The insufficient lubrication results in the increase in temperature of the second bearing and results in the shortness of service life thereof.

SUMMARY OF THE INVENTION

An object of the present invention is to provide an improvement in the conventional transmission, in which a sufficient quantity of lubricating oil is supplied to the first bearing and the seal member to enable the service life of the first bearing and seal member to be improved.

According to the present invention, there is provided an improvement which comprises a chamber defined by and between the bearing retainer and the first bearing, the seal member being exposed to the chamber, oil-receiving means disposed within the housing adjacent to the input gear for receiving the lubricating oil scooped up by the counter gear when the input shaft is rotated to cause the counter gear in mesh with the input gear to be rotated, and a passage for communicating the oil-receiving means and the chamber with each other to introduce the lubricating oil from the oil-receiving means into the chamber.

It is preferable that the bearing retainer cooperates with the second bearing to define a second chamber between the bearing retainer and the second bearing, and the second chamber communicates through a second passage with the chamber defined between the bearing retainer and the first bearing.

DETAILED DESCRIPTION OF THE PREFERRED EMBODIMENT

Figure 1:
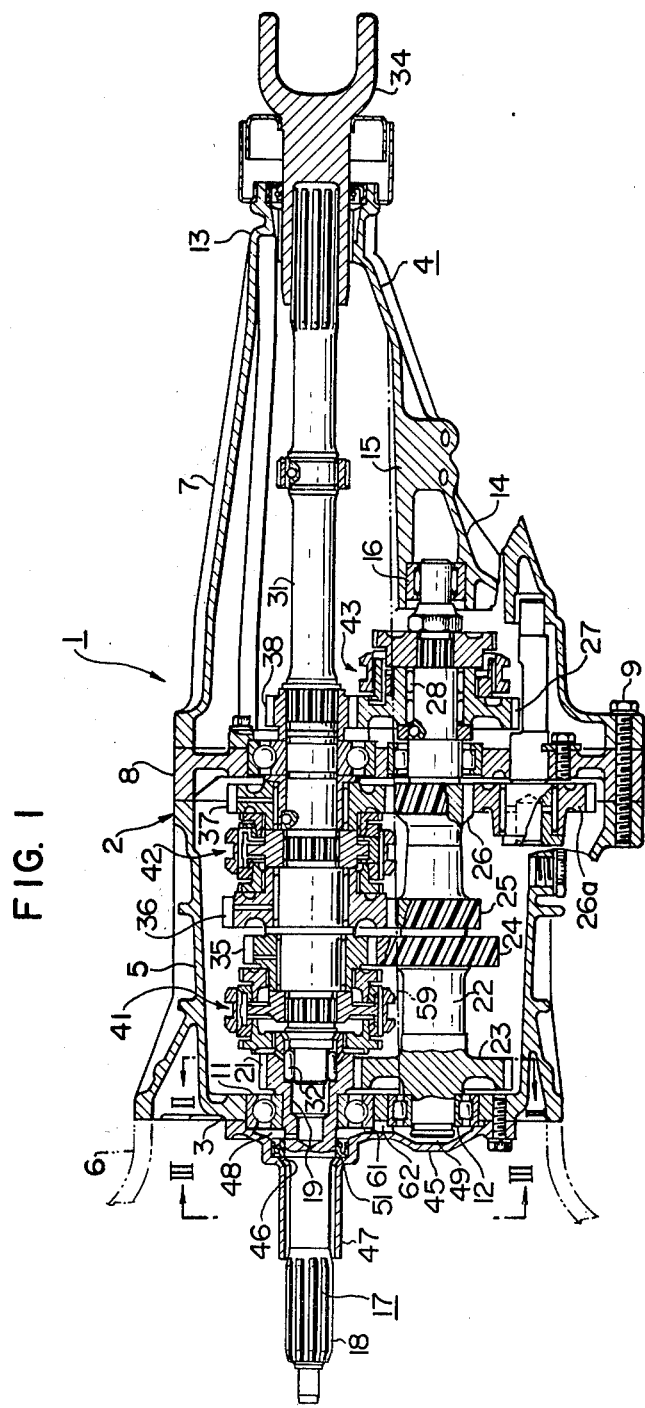
FIG. 1 is a longitudinal cross-sectional view showing a transmission according to the present invention.

Referring to FIG. 1, a manual transmission for vehicles, generally designated by 1, comprises an elongated housing 2 which includes one longitudinal end wall 3 and the other longitudinal end wall 4 and has a bottom defining a reservoir for lubricating oil. The housing 2 comprises a main housing section 5 adapted to be connected to a clutch housing 6 shown by phantom lines by means of fastening means such as bolts, and an extension housing section 7 connected to the main housing section 5 through an intermediate plate 8 for supporting bearings, by means of bolts 9.

A ball bearing 11 and a roller bearing 12 are disposed in upper and lower sections of the one longitudinal end wall 3 of the housing 2, respectively. The other longitudinal end wall 4 includes an upper wall section 13 and a lower wall section 14 which is offset from the upper wall section 13 toward the one longitudinal end wall 3 of the housing to define a step surface 15 between the upper and lower wall sections 13 and 14. A roller bearing 16 is disposed in the lower wall section 14 of the other longitudinal wall 4 and is axially aligned with the roller bearing 12.

An input shaft 17 is rotatably supported by the ball bearing 11 and has one axial end 18 adapted to be connected to a not-shown output shaft of a not-shown engine through a not-shown clutch and the other axial end 19 extending into the housing 2. An input gear 21 is integrally formed on the other axial end 19 of the input shaft 17. A counter shaft 22 extends parallel to the input shaft 17 and has axial one and the other ends thereof rotatably supported by the bearings 12 and 16, respectively. The counter shaft 22 has formed integrally therewith a third, second, first and reverse counter gears 23, 24, 25 and 26 from the left in FIG. 1. The third counter gear 23 is in mesh with the input gear 21. A fourth or over-top counter gear 27 is mounted on the counter shaft 22 through a roller bearing 28 for rotation relative to the counter shaft.

An output shaft 31 has one axial end thereof which is rotatably fitted through a bearing 32 into a bore in the other axial end 19 of the input shaft 17, and the other axial end which is rotatably supported in the other longitudinal end wall 4 of the housing 2 through a sleeve yoke 34 and is adapted to be connected to a not-shown propeller shaft. A second output gear 35 in mesh with the second counter gear 24, a first output gear 36 in mesh with the first counter gear 25 and a reverse output gear 37 in mesh with the reverse counter gear 26 are mounted on the output shaft 31 through respective bearings for rotation relative to the output shaft 31. A fourth or over-top output gear 38 is in mesh with the fourth counter gear 27 and is mounted on the output shaft 31 for rotation therewith.

Synchronizers 41, 42 and 43 are disposed between the input gear 21 and the second output gear 35, between the first output gear 36 and the reverse output gear 37, and between the fourth counter gear 27 and the counter shaft 22, respectively. Such synchronizers are known per se and form no part of the present invention. Detailed descriptions of the synchronizers will be omitted.

A bearing retainer 45 is mounted on the outer surface of the one longitudinal end wall 3 of the housing 2 to retain the bearings 11 and 12 in their axial positions. The bearing retainer 45 has therein an opening 46 through which the input shaft 17 extends, and a tubular extension 47 projecting away from the opening 46 to surround the input shaft 17. The bearing retainer 45 has an inner surface thereof which cooperates with the outer end surfaces of the bearings 11 and 12 to define first and second chambers 48 and 49, respectively. A ring seal member 51 made of a resilient material such as rubber is disposed between the opening 46 and the input shaft 17 within the first chamber 48 to seal an annular clearance between the opening 46 and the input shaft 17.

Figure 2:
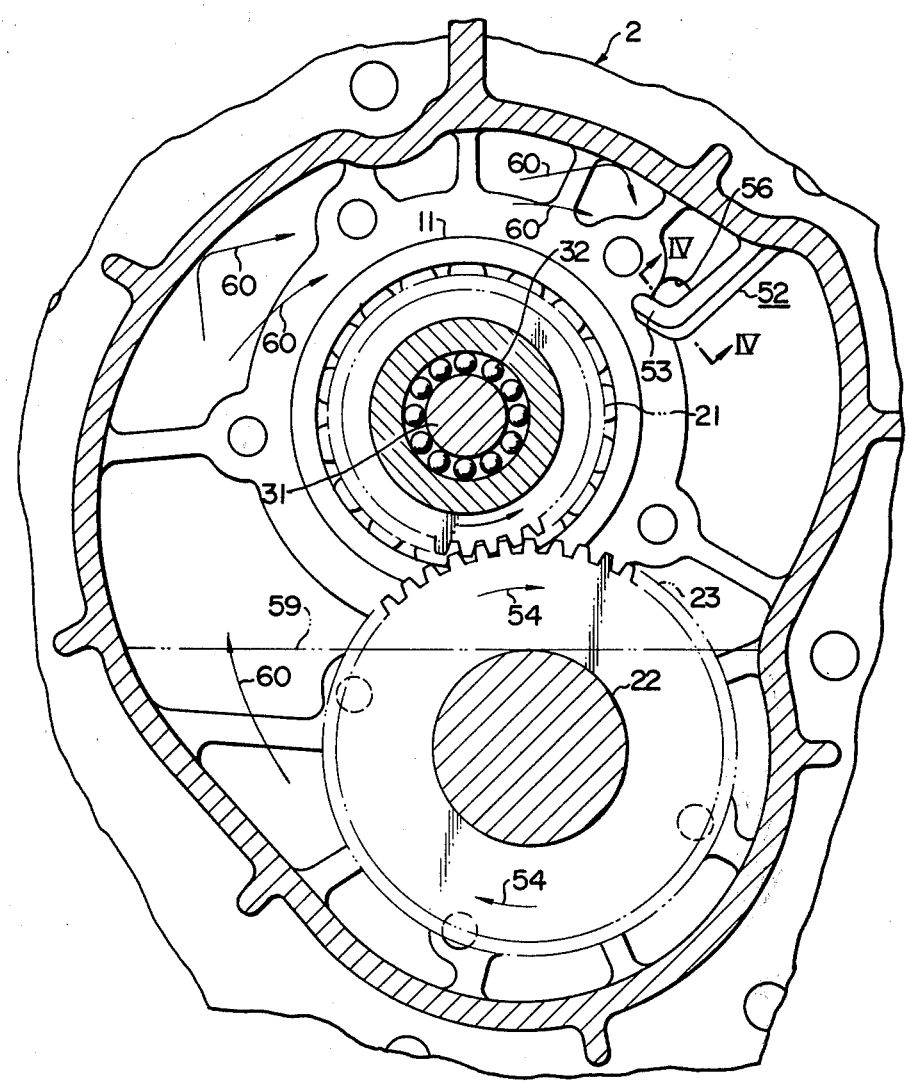
FIG. 2 is a cross-sectional view taken along a line II—II of FIG. 1.
Figure 3:
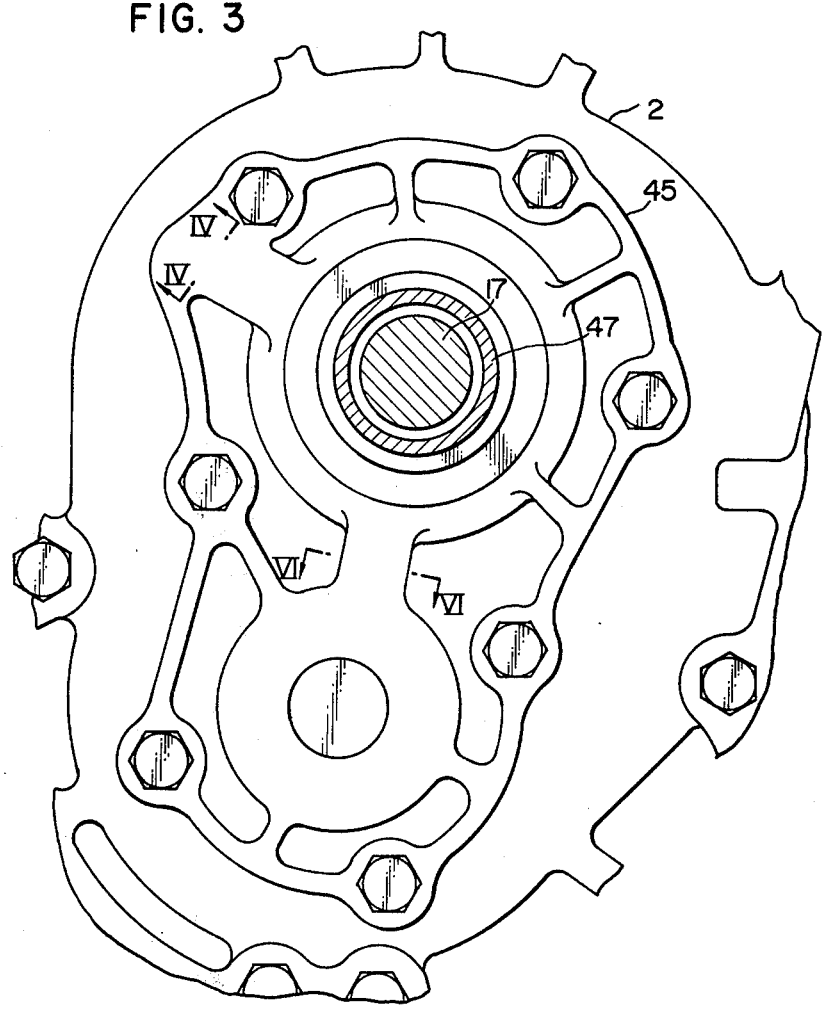
FIG. 3 is a cross-sectional view taken along a line III—III of FIG. 1.
Figure 4:
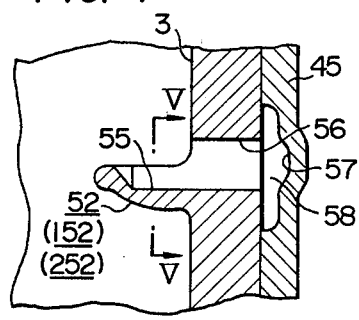
FIG. 4 is a cross-sectional view taken along a line IV—IV of FIGS. 2, 3, 7, 8 and 9.
Figure 5:
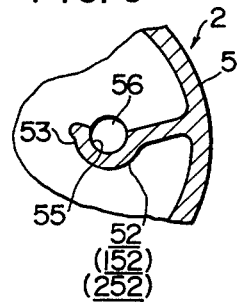
FIG. 5 is a cross-sectional view taken along a line V—V of FIG. 4.

As best shown in FIG. 2, a receiver 52 for lubricating oil is integrally formed on the wall of the housing by means of casting and comprises a shelf projecting inwardly from the inner surface of the housing adjacent to the top thereof toward the circumferential surface of the input gear 21. The oil receiver 52 has a tip 53 thereof bent upwardly. The oil receiver 52 is disposed on the side wall (the right side wall in FIG. 2) of the housing 2 facing the rotational direction of the top of the third counter gear 23 upon the rotation thereof in the direction shown by an arrow 54. As shown in FIGS. 4 and 5, the oil receiver 52 has a groove 55 formed in the upper surface of the oil receiver 52.

The groove 55 in the oil receiver 52 comprises a bore 56 formed through the one longitudinal end wall 3 of the housing 2 by means of drilling from the end surface of the one longitudinal end wall 3 remote from the other longitudinal end wall 4. The groove 55 communicates with the first chamber 48 through the bore 56 and a passage 58 defined by a groove 57 in the inner surface of the bearing retainer 45 and the outer surface of the one longitudinal end wall 3.

When the clutch between the output shaft of the engine and the input shaft 17 is released and an operator moves a not-shown shift lever to a first or low position, the synchronizer 42 is moved from its neutral position to directly connect the first output gear 36 to the output shaft 31. Then, when the clutch is energized, the rotation of the output shaft of the engine is transmitted through the clutch to the input shaft 17 to cause the input gear 21 to be rotated. The rotation of the input gear 21 is transmitted to the output shaft 31 through the third counter gear 23, the counter shaft 22, the first counter gear 25 and the first output gear 36. When the shift lever is moved to a second position, the synchronizer 42 releases the direct connection between the first output gear 36 and the output shaft 31 and is returned to the neutral position. The synchronizer 41 is moved from its neutral position to directly connect the second output gear 35 to the output shaft 31, so that the rotation of the input gear 21 is transmitted to the output shaft 31 through the third counter gear 23, the counter shaft 22, the second counter gear 24 and the second output gear 35. When the shift lever is moved to a third position, the synchronizer 41 releases the direct connection between the second output gear 35 and the output gear 31 and directly connects the third output gear or input gear 21 to the output shaft 31, so that the rotation of the input gear is directly transmitted to the output shaft 31. When the shift lever is moved to a fourth position, the synchronizer 41 releases the direct connection between the input gear 21 and the output shaft 31 and is returned to the neutral position. Whereupon, the synchronizer 43 is moved from its neutral position to connect the fourth counter gear 27 to the counter shaft 22. The rotation of the input shaft 21 is transmitted to the output shaft 31 through the third counter gear 23, the counter shaft 22, the fourth counter gear 27 and the fourth output gear 38. In addition, when the shift lever is moved to a reverse position, the synchronizer 42 directly connects the reverse output gear 37 to the output shaft 31, so that the rotation of the input gear is reversed and transmitted to the output shaft through the third counter gear 23, the counter shaft 22, the reverse counter gear 26, a reverse idler gear 26a and the reverse output shaft 37. The reverse idler gear 26a is shown in FIG. 1 in an exploded manner for the purpose of easy reference to the disposition of the idler gear.

The lubricating oil within the reservoir defined at the bottom of the housing has a level shown by a phantom line 59 when a transmission is installed on a vehicle. When the counter shaft 22 is rotated, the lubricating oil is scooped up by the counter gears 23-27. The main flow of the lubricating oil scooped up by the counter gear 23 passes around the counter gear 23 and the input gear and is received by the oil receiver 52, as shown by arrows 60. The lubricating oil received by the oil receiver 52 is, as shown in FIG. 4, introduced into the first chamber 48 through the groove 55 in the oil receiver, the bore 56 in the one longitudinal end wall 3 of the housing 2, and the passage 58 defined by the groove 57 in the bearing retainer 45. The lubricating oil introduced into the first chamber 48 is supplied to the ball bearing 11 and the seal member 51 to lubricate the same.

Figure 6:
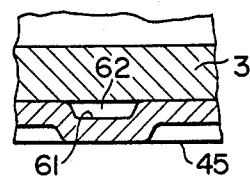
FIG. 6 is a cross-sectional view taken along a line VI—VI of FIG. 3.

As shown in FIGS. 1 and 6, the first chamber 48 communicates with the second chamber 49 through a restricting passage 62 defined by a groove 61 in the inner surface of the bearing retainer 45 and the outer surface of the one longitudinal end wall 3 of the housing 2. The lubricating oil introduced into the first chamber 48 from the oil receiver 52 is once retained in the first chamber 48 and is gradually or slowly introduced into the second chamber 49 through the restricting passage 62. The lubricating oil introduced into the second chamber 49 is supplied to the roller bearing 12 to lubricate the same.

When the counter shaft 22 is rotated, the lubricating oil of the level 59 within the reservoir defined at the bottom of the housing 2 is scooped up by the counter gears 23-27 and is decreased to such a level that the substantially entire roller bearing 12 is exposed, so that the lubricating oil for the bearing 12 becomes insufficient in quantity. However, the second chamber 49 communicating with the bearing 12 is continuously supplied with the lubricating oil from the first chamber 48. The lubricating oil in the second chamber 49 is returned through the bearing 12 to the reservoir at the bottom of the housing 2. Thus, the lubricating oil is recirculated. Accordingly, a sufficient quantity of lubricating oil is continuously supplied to the bearing 12.

As described above, in the transmission according to the present invention, during the rotation of the input gear, the lubricating oil within the reservoir defined at the bottom of the housing is scooped up by the counter gear 23 and is received by the oil receiver 52. The lubricating oil received by the oil receiver 52 is always introduced into the first chamber 48 through the bore 56 and the passage 58. Accordingly, irrespective of the rotational speed of the input shaft 17 and/or the temperature of the lubricating oil, the lubricating oil is supplied to the bearing 11 and the seal member 51, during the rotation of the input shaft 17. Because of the supply of a sufficient quantity of lubricating oil to the bearing 11, the increase in temperature of the bearing is restrained, and the service life of the bearing can be prolonged. In addition, because of the supply of a sufficient quantity of lubricating oil to the seal member 51, the leakage of lubricating oil due to the deterioration or degradation in material of the seal member can be effectively prevented from occuring.

The lubricating oil introduced into the first chamber 48 is slowly or gradually introduced into the second chamber 49 through the restricting passage 62. Accordingly, even if the lubricating oil within the reservoir defined at the bottom of the housing is scooped up and the bearing 12 is exposed during the rotation of the input shaft 17, a sufficient quantity of lubricating oil is supplied to the bearing 12 to restrain the increase in temperature of the bearing 12, thereby to enable the service life of the bearing to be prolonged.

Figure 7:
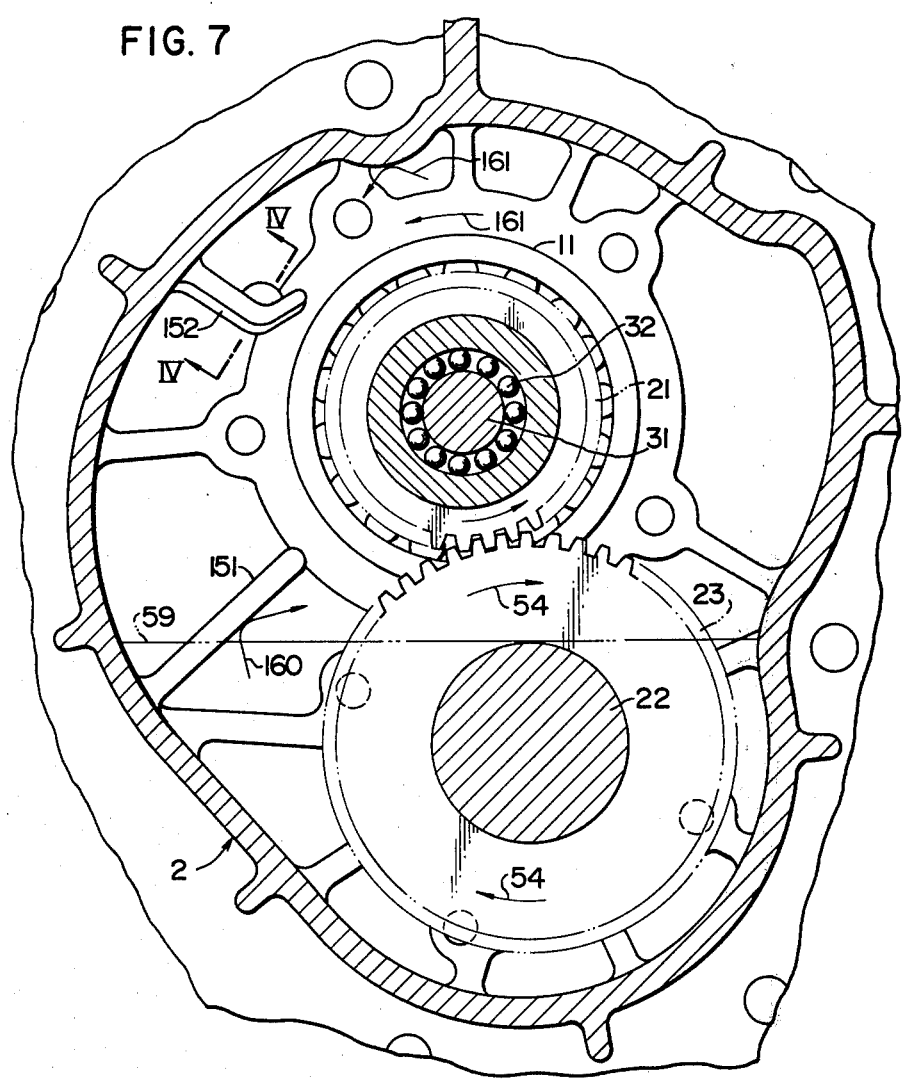
FIG. 7 is a cross-sectional view similar to FIG. 2, but showing an another embodiment of the present invention.
Figure 8:
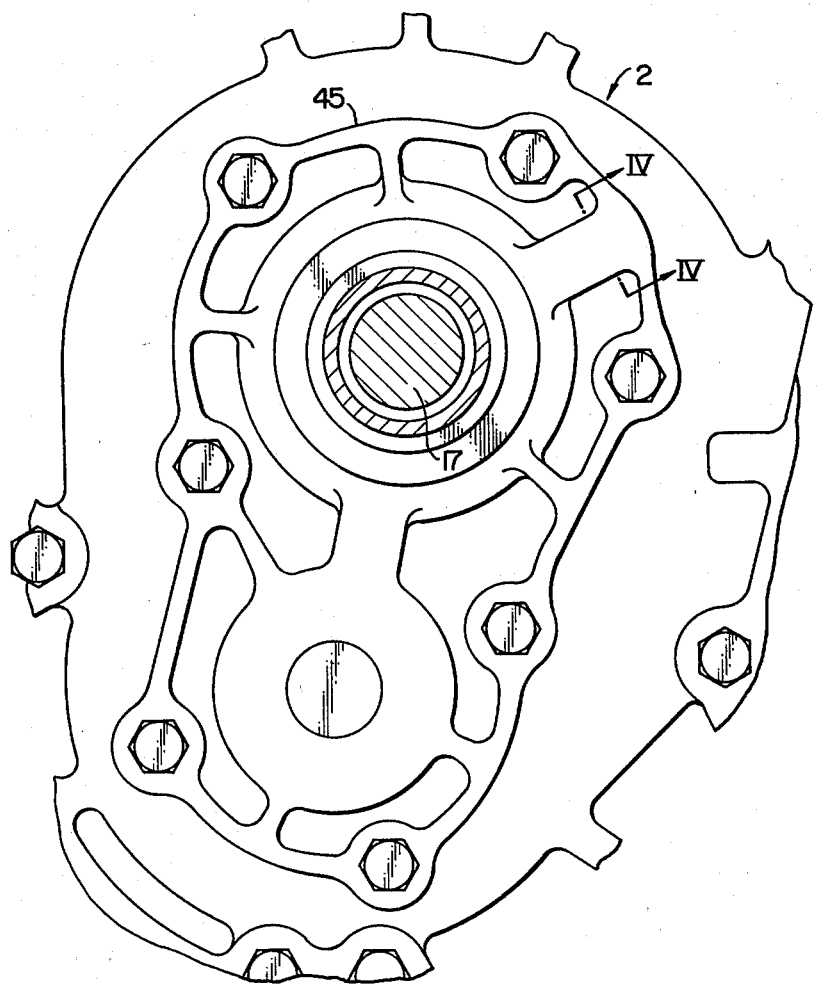
FIG. 8 is a cross-sectional view similar to FIG. 3, but showing the another embodiment.

FIGS. 7 and 8 illustrate an another embodiment of the present invention. In FIGS. 7 and 8, the same reference numerals are applied to the same portions and elements as those of the embodiment shown in FIGS. 1-6. A baffle 151 projects inwardly from the inner surface of the side wall of the housing 2 facing opposite to the rotational direction of the top of the counter gear 23 upon the rotation thereof in the direction shown by the arrow 54, toward a nip between the counter gear 23 and the input gear 21 in mesh with each other.

An oil receiver 152 is substantially the same in configuration and dimension as the oil receiver 52 of the embodiment shown in FIGS. 1-6, but is disposed on the side wall of the housing 2 on which is the baffle 151 is formed, above the baffle.

When the counter shaft 22 is rotated, the lubricating oil within the reservoir defined at the bottom of the housing 2 is scooped up by the counter gear 23 and other counter gears (24-27 in FIG. 1). The lubricating oil scooped up by the counter gear 23 impinges against the baffle 151, is deflected toward the nip between the input gear 21 and the counter gear 23, as shown by an arrow 160, flows around the input gear 21, as shown by arrows 161, and is received by the oil receiver 152. In a similar manner to the embodiment shown in FIGS. 1-6, the lubricating oil received by the oil receiver 152 is introduced into the first and second chambers (48 and 49 in FIG. 1) to lubricate the bearing 11, the seal member (51 in FIG. 1) and the bearing (12 in FIG. 1).

Figure 9:
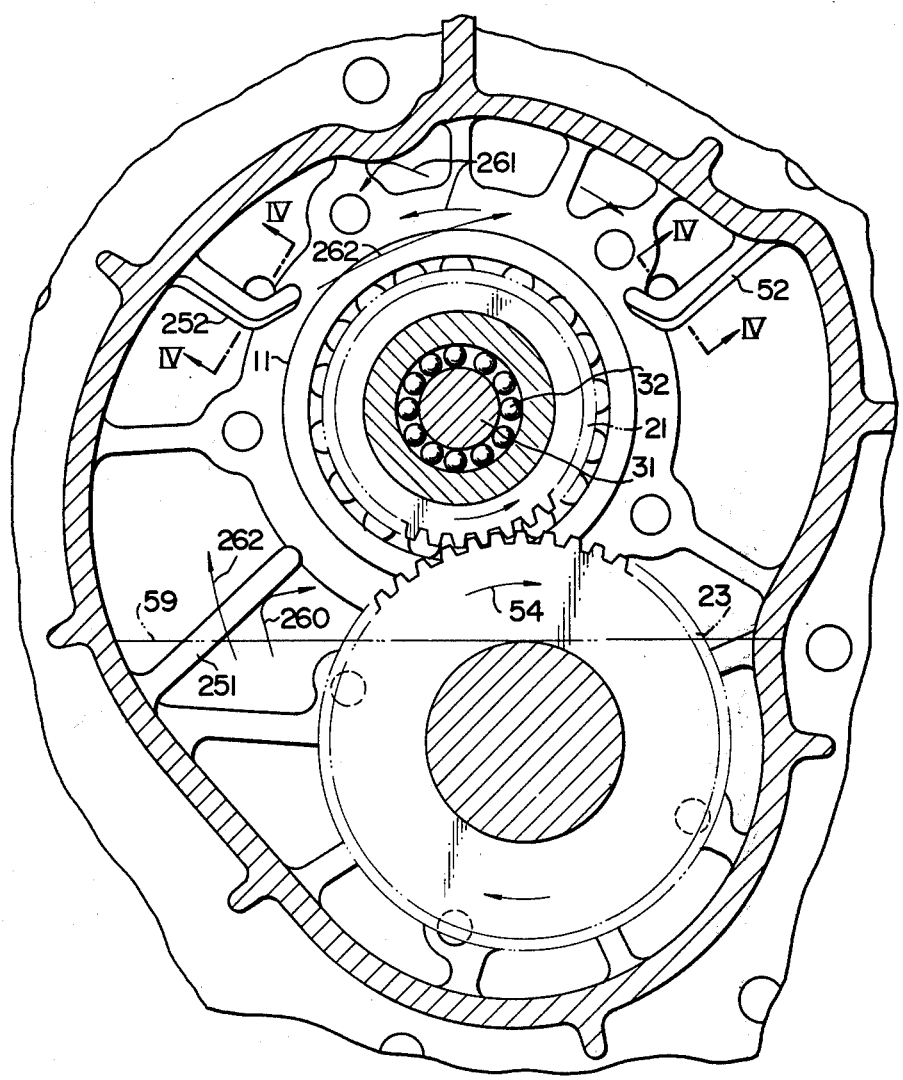
FIG. 9 is a cross-sectional view similar to FIG. 2, but showing a still another embodiment of the present invention.

FIG. 9 illustrates a still another embodiment of the present invention, and is a cross-sectional view similar to FIG. 2. In FIG. 9, the same reference numerals are applied to the same portions and elements as those of the embodiment shown in FIGS. 1-6. A baffle 251 projects inwardly from the inner surface of the side wall of the housing 2 facing opposite to the rotational direction of the top of the counter gear 23 upon the rotation thereof in the direction shown by the arrow 54, toward the nip between the counter gear 23 and the input gear 21 in mesh with each other.

An oil receiver 252 is substantially the same in configuration and dimension as the oil receiver 52 of the embodiment shown in FIGS. 1-6, but is disposed on the side wall of the housing 2 on which the baffle 251 is formed, above the baffle and in a position opposite to the oil receiver 52 mounted on the right side wall of the housing in FIG. 9, in addition to the right oil receiver 52.

When the counter shaft 22 is rotated, the lubricating oil of the level 59 within the reservoir defined at the bottom of the housing 2 is scooped up by the counter gear 23 and other counter gears (24-27 in FIG. 1). The main flow of the lubricating oil scooped up by the counter gear 23 impinges against the baffle 251, is deflected toward the nip between the input gear 21 and the counter gear 23, as shown by an arrow 260, is directed as shown by an arrow 261 by the input gear 21, and is received by the oil receiver 252. The remaining portion of the lubricating oil scooped up by the counter gear 23 flows around the input gear 21, as shown by arrows 262, and is received by the oil receiver 52. The lubricating oil received by the oil receivers 52 and 252 is introduced into the first and second chambers (48 and 49 in FIG. 1) to lubricate the bearing 11, the seal member (51 in FIG. 1) and the bearing (12 in FIG. 1), in a similar manner to the embodiment shown in FIGS. 1-6.

Figure 10:
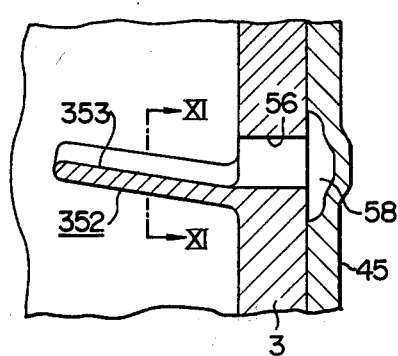
FIG. 10 is a cross-sectional view similar to FIG. 4, but showing a modification of an oil receiver.
Figure 11:
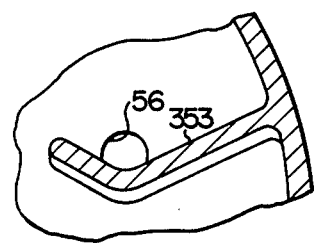
FIG. 11 is a cross-sectional view taken along a line XI—XI of FIG. 10.

FIGS. 10 and 11 illustrate a first modification of the oil receiver 52 in the embodiment shown in FIGS. 1-6, and are cross-sectional views similar to FIGS. 4 and 5, respectively. In FIGS. 10 and 11, the same reference numerals are applied to the same portions and elements as those of the embodiment shown in FIGS. 1-6. A shelf-like oil receiver 352 shown in FIGS. 10 and 11 projects inwardly from the inner wall surface of the housing 2 toward the input gear (21 in FIG. 1) and has an upper surface 353 which has a V-shaped cross-section to define a trough. The upper surface 353 is inclined downwardly toward the bore 56 in the one longitudinal end wall 3 of the housing 2. The trough defined by the upper surface 353 of the oil receiver 352 communicates with the passage 58 through the bore 56.

Figure 12:
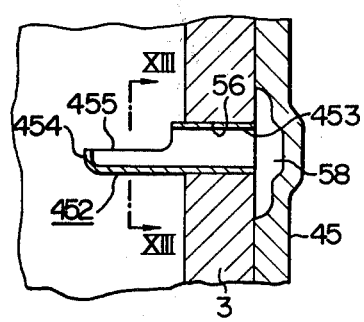
FIG. 12 is a cross-sectional view similar to FIG. 4, but showing an another modification of an oil receiver.
Figure 13:
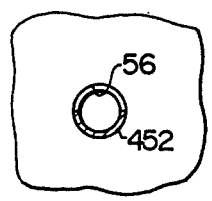
FIG. 13 is a cross-sectional view taken along a line XIII—XIII of FIG. 12.

FIGS. 12 and 13 illustrate a second modification of the oil receiver 52 in the embodiment shown in FIGS. 1-6, and are cross-sectional view similar to FIGS. 4 and 5, respectively. In FIGS. 12 and 13, the same reference numerals are applied to the same portions and elements as those of the embodiment shown in FIGS. 1-6. An oil receiver shown in FIGS. 12 and 13 comprises a tubular member 452 which has an open end 453 intimately fitted into the bore 56 in the one longitudinal end wall 3 of the housing 2 and a closed end 454 projecting from the one longitudinal end wall 3 toward the input gear (21 in FIG. 1). A top wall of the closed end 454 of the tubular member 452 is removed to form a trough having an opening 455 which communicates with the passage 58 through a hollow portion of the tubular member 452.

What we claim is:

1. In a transmission comprising:
   a housing having one longitudinal end wall and the other longitudinal end wall and having a bottom defining a reservoir for lubricating oil;
   a first bearing disposed in the one longitudinal end wall of said housing adjacent to the top thereof, a second bearing disposed in the one longitudinal end wall of said housing adjacent to the bottom thereof, and a third bearing disposed in the other longitudinal end wall of said housing in an axially aligned relation to said second bearing;
   an input shaft rotatably supported by said first bearing and having one axial end projecting outwardly of said housing and the other axial end projecting inwardly of said housing;
   an input gear mounted on the other axial end of said input shaft for rotation therewith;
   a counter shaft extending parallel to said input shaft and rotatably supported by said second and third bearings;
   a counter gear mounted on said counter shaft for rotation therewith and in mesh with said input gear, said counter gear having at least a portion thereof dipped in the lubricating oil within said reservoir;
   a bearing retainer mounted on an outer surface of the one longitudinal end wall of said housing for retaining said first and second bearings in their positions, said bearing retainer having therein an opening through which said input shaft extends; and
   a seal member disposed between said bearing retainer and said input shaft for sealing a clearance between said opening in said bearing retainer and said input shaft;
   the improvement which comprises:
   a chamber defined between said bearing retainer and an end surface of said first bearing facing said bearing retainer, said seal member being exposed to said chamber;
   oil-receiving means disposed within said housing adjacent to said input gear for receiving the lubricating oil scooped up by said counter gear when said input shaft is rotated to cause said counter gear in mesh with said input gear to be rotated; and
   a passage for communicating said oil-receiving means and said chamber with each other to introduce the lubricating oil from said oil-receiving means into said chamber for lubricating said seal member and said first bearing,
   said transmission further comprising a second chamber defined by and between said bearing retainer and said second bearing, and a second passage for communicating said first-mentioned chamber and said second chamber with each other to introduce lubricating oil from said first-mentioned chamber into said second chamber for lubricating said second bearing.

2. A transmission claimed in claim 1, wherein said second passage is sized to restrict the flow of the lubricating oil from said first-mentioned chamber to said second chamber.

3. A transmission claimed in claim 2, wherein said second passage is defined by a groove formed in an inner surface of said bearing retainer and an outer surface of the one longitudinal end wall of said housing facing said groove.

4. A transmission claimed in claim 1, 2 or 3, wherein said oil-receiving means comprising at least one oil receiver projecting from an inner wall surface of said housing toward said input gear.

5. A transmission claimed in claim 4, wherein said oil receiver is mounted on a side wall of said housing facing the rotational direction of the top of said counter gear upon the rotation thereof.

6. A transmission claimed in claim 4, wherein said oil receiver is mounted on a side wall of said housing facing opposite to the rotational direction of the top of said counter gear upon the rotation thereof.

7. A transmission claimed in claim 4, wherein said oil-receiving means comprises two oil receivers, the two oil receivers being mounted on opposite side walls of said housing, respectively.

8. A transmission claimed in claim 6, further comprising a baffle projecting from an inner surface of said housing toward a nip between said input gear and said counter gear for deflecting the lubricating oil scooped up by said counter gear toward said nip.

9. A transmission claimed in claim 4, wherein said oil receiver is integrally formed on the wall of said housing.

10. A transmission claimed in claim 4, wherein said oil receiver comprises a trough member formed separately from the wall of said housing.

11. A transmission claimed in claim 4, wherein said first-mentioned passage comprises a bore formed through the wall of said housing in communication with an upper surface of said oil receiver.

12. A transmission claimed in claim 11, wherein said bore is formed through the longitudinal one end wall of said housing, and wherein said first-mentioned passage further comprises a passage section defined by a groove formed in said bearing retainer and the outer surface of the one longitudinal end wall of said housing, said passage section having one end thereof communicating with said first-mentioned chamber and the other end communicating with said bore.

13. A transmission claimed in claim 11, wherein said oil receiver has formed in the upper surface thereof a groove communicating with said bore.

14. A transmission claimed in claim 10, wherein said first-mentioned passage comprises a bore formed through the wall of said housing, said trough member having one end thereof fitted into said bore.

* * * * *